(12) United States Patent
Breazeale

(10) Patent No.: US 7,011,164 B1
(45) Date of Patent: Mar. 14, 2006

(54) ENGINE DISABLER SPRAY SYSTEM

(76) Inventor: O. Alan Breazeale, 8307 County Rd. 6920, Lubbock, TX (US) 79407

( * ) Notice: Subject to any disclaimer, the term of this patent is extended or adjusted under 35 U.S.C. 154(b) by 142 days.

(21) Appl. No.: 10/653,646

(22) Filed: Sep. 3, 2003

(51) Int. Cl.
A62C 3/07 (2006.01)

(52) U.S. Cl. .............................. 169/62; 169/68; 169/70; 180/287; 239/289

(58) Field of Classification Search ................. 169/62, 169/24, 68, 70, 51; 123/25 Q–25 R; 180/287
See application file for complete search history.

(56) References Cited

U.S. PATENT DOCUMENTS 3,779,461 A * 12/1973 Paul ........................... 239/172
4,593,855 A * 6/1986 Forsyth ........................ 239/74
4,678,041 A * 7/1987 Staudinger .................... 169/24
5,476,146 A * 12/1995 Brown ......................... 169/24
6,334,490 B1 * 1/2002 Dille ........................... 169/62

* cited by examiner

Primary Examiner—Dinh Q. Nguyen
(74) Attorney, Agent, or Firm—Peter Loffler

(57) ABSTRACT

An engine disabler spray system allows a first chase vehicle to disable a second fleeing vehicle by spraying a fire suppressant agent from the first vehicle at the second vehicle wherein the fire suppressant agent is sucked through the air intake of the second vehicle's engine and once the fire suppressant agent enters the engine, the engine is robbed of oxygen and ceases thereby. The fire suppressant agent is stored within a tank located within the trunk of the first vehicle and is discharged through nozzles located on the back of the first vehicle. The nozzles may be directionally controlled for optimum targeted spraying at the second vehicle.

18 Claims, 2 Drawing Sheets

ENGINE DISABLER SPRAY SYSTEM

BACKGROUND OF THE INVENTION

1. Field of the Invention

The present invention relates to a system that discharges a spray that is capable of temporarily disabling an engine of a fleeing vehicle in order to allow law enforcement personal and others to disable aid thereby detain the vehicle.

2. Background of the Prior Art

Many people have witnessed high speed chases on television wherein a fleeing suspect in a vehicle attempts to escape from pursuing law enforcement. While such chases can be griping and entertaining to a fan of reality television, such chases are extremely dangerous. Oftentimes, a suspect will race his vehicle at over 100 miles par hour in an attempt to elude capture. At such speeds, the potential for the suspect to loose control of the vehicle is high resulting in disaster, such a danger being especially acute when the chase is on crowded surface streets. Although the police have high speed chase training, they are not immune from loss of control of their vehicle, also adding to chase danger. Additionally, the suspect can hit a pedestrian or another vehicle causing injury and death to innocent bystanders. This is especially true when the suspect ignores traffic control devices such as stop signs and red lights. Even when the chase occurs at slower speeds and the suspect exhibits less reckless maneuvers, the chase is usually conducted by several police units, preventing these units from attending to other police matters. Many suspects involved in high speed chases are doing so because they are intoxicated and want to avoid going to jail. Such suspects are dangerous at any speed, whether being chased by police or not.

Obviously, when a suspect attempts to flee from police in a motor vehicle, the police want to shut the chase down as fast as possible before anybody gets hurt or killed. One method used by law enforcement to disable a vehicle involved in a high speed chase and bring the chase to a halt is to shoot out one or more tires of the fleeing vehicle in order to slow and ultimately stop the vehicle. This method often proves successful, especially when a suspect realizes that the police are shooting at him and he does not want to be shot himself. However, the potential exists for a bullet to ricochet and cause unintended injury or damage. Moreover, the possibility exists that a bullet may enter the passenger compartment of the pursued vehicle causing death or injury to the driver or others in the vehicle, which others may not be willing passengers. Additionally, the sudden rapid deflation of the chased vehicle's tire can cause the vehicle to go out of control, again raising the potential for undesired injury or damage. Accordingly, the process of shooting out a vehicle's tires tends to be a last resort of modern day vehicle stop techniques.

Another method being used by police to disable a fleeing vehicle involves the use of spike strips which are strips that have hollow spikes disposed along the length of the strip. As a vehicle passes over the strip, one or more spikes are forced into the tire causing a slow bleeding of air out of the vehicle's tires. This results in a more controlled deflating of the vehicle's tires, allowing for a gradual loss of ability to drive, and minimizing the potential for the vehicle to spin out of control. Many current spike strip models have enable/disable features which allow the device to be enabled while the suspect vehicle passes over the strip and thereafter to be quickly disabled so that pursuing police cars are not affected by the strip. Although spike strips are effective when deployed, they require that the police know where the suspect is heading so that an officer, not in direct pursuit of the suspect, can be positioned ahead of the vehicle in order to be able to deploy the spike strip into the vehicle's travel path. This can prove quite difficult especially when the suspect makes a lot of direction changes during the chase or when only two or three police units are chasing the vehicle as is often the case in rural areas. Additionally, the officer operating the spike strip must exist the police vehicle and must be positioned by the side of the road. This not only takes this officer out of the actual chase and places the officer into harms way, many chase suspects are familiar with the spike strips and how they are deployed, and upon seeing an officer on the side of the road, such suspects simply serves out of the way of the strip. Sometimes, such suspects swerve directly into the officer operating the spike strip.

Another method used by police to stop a fleeing vehicle is known as a PIT maneuver wherein a police vehicle strategically strikes the rear quarter panel of the suspect vehicle causing the suspect vehicle to spin out of control and to stop. Although this method works quite well, it requires precise execution and is typically performed by an officer with specific training in such maneuvers, which officer may not always be available. Additionally, as the maneuver requires police vehicle to suspect vehicle contact, the maneuver places all concerned, as well as bystanders, into harms way and the maneuver is not performed when the chase is being conducted on busy streets due to the extreme danger to bystanders.

A cousin to the PIT maneuver is for the police to simply ram the suspect off the road. This maneuver, which often results in the crash of the suspect vehicle, can be very dangerous. Oftentimes, the suspect vehicle will crash into a fixed barrier resulting in injury or death. While such a result is preferred over injury or death to an officer or a bystander, the paramount goal of the officers involved in a police chase is to end the chase without injury to anyone including the suspect.

Therefore, there exists a need in the art for a system whereby police can quickly stop a suspect in a fleeing vehicle while minimizing the risk to themselves, bystanders, and the suspect. Such a system should not require a police officer to exit the police vehicle in order to perform the method of the system and should not require a high level of specialized training to execute the method so that the method can be performed by most officers. Even in chases involving very few pursuit officers, the method should work appropriately. Ideally, such a system is relatively simple in operation.

SUMMARY OF THE INVENTION

The engine disabler spray system of the present invention addresses the aforementioned needs in the art. The present invention provides a system whereby police and others can quickly stop a suspect in a fleeing vehicle while minimizing the risk to themselves, bystanders, and the suspect. Deployment of the present system does not require a police officer to exit the police vehicle in order to perform the method of the system and does not require a high level of training to execute. Most, if not all, police officers can execute the method with little or no additional training. The method can be executed by a single officer. The engine disabler spray system is relatively simple in operation.

The engine disabler spray system of the present invention is comprised of a tank stored within a first vehicle, the tank having a fire suppressant agent stored therein. A discharge nozzle is fluid flow connected with the tank, and is disposed on the vehicle, preferably within a rear portion of the first vehicle. The fire suppressant agent is pumped from the tank and through the discharge nozzle and directed at an air intake of the engine of a second vehicle, such that when the air intake of the second vehicle's engine sucks the fire suppressant agent, the engine is thereby disabled. A servo motor is mechanically linked to the nozzle for directionally controlling the nozzle while a directional control switch is provided for directionally controlling the nozzle, the directional control switch mounted on a dashboard of the first vehicle. The fire suppressant agent is FE-36 clean agent fire extinguishant, or may be is selected from the group consisting of: Halon 1211, Halon 1301, IG-541, HFC-227ea, HFC-2 (FE13), HCFC Blend A, Carbon Dioxide, high expansion foam, protein foam, AFFF, microbial containing foam, Carbon Tetrachloride, dry powder extinguishant, and wet chemical extinguishant. The tank holding the fire suppressant agent is located within a trunk of the first vehicle, while the nozzle may be disposed within a rear bumper of the first vehicle.

BRIEF DESCRIPTION OF THE DRAWINGS

Similar reference numerals refer to similar parts throughout the several views of the drawings.

DESCRIPTION OF THE PREFERRED EMBODIMENT

Figure 1:
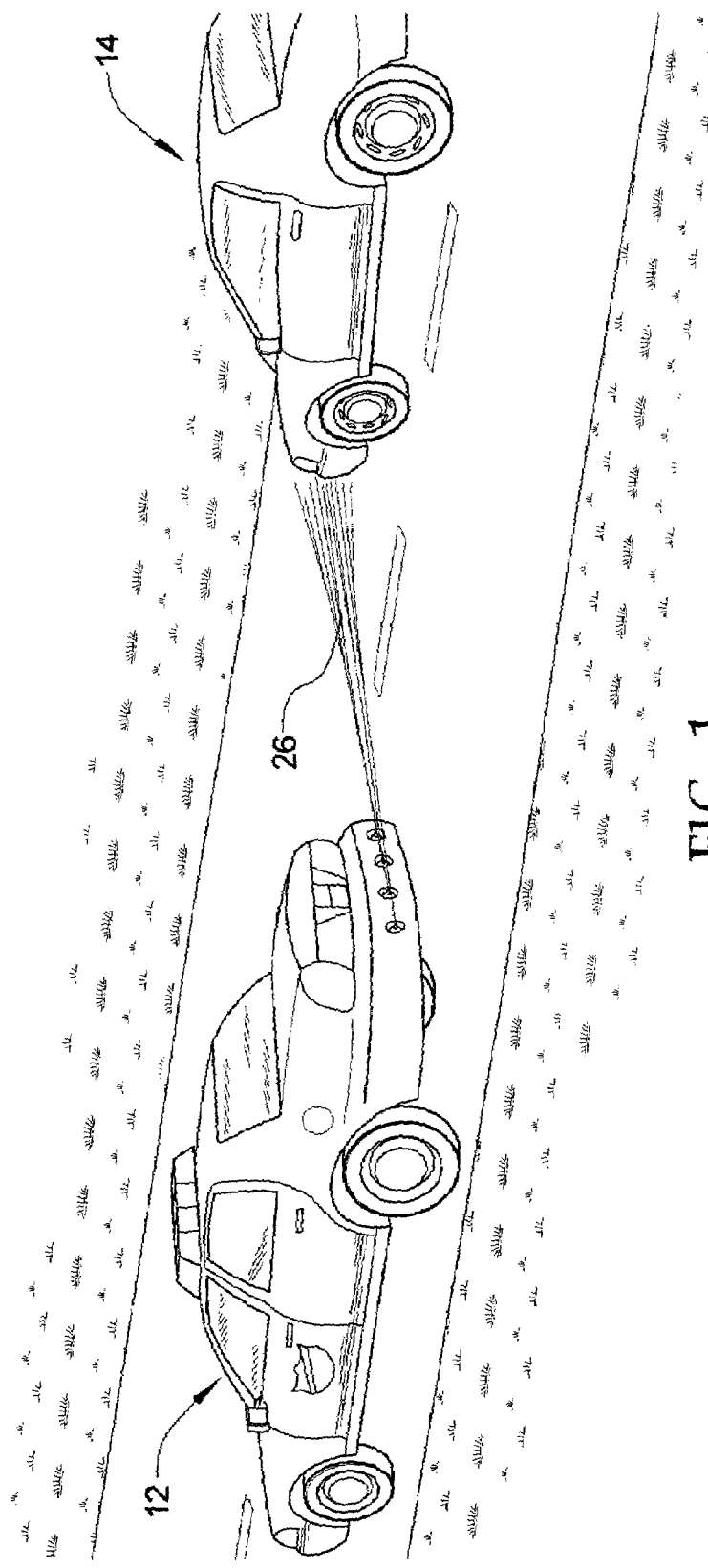
FIG. 1 is an environmental view of the engine disabler spray system of the present invention being used to disable a fleeing vehicle.
Figure 2:
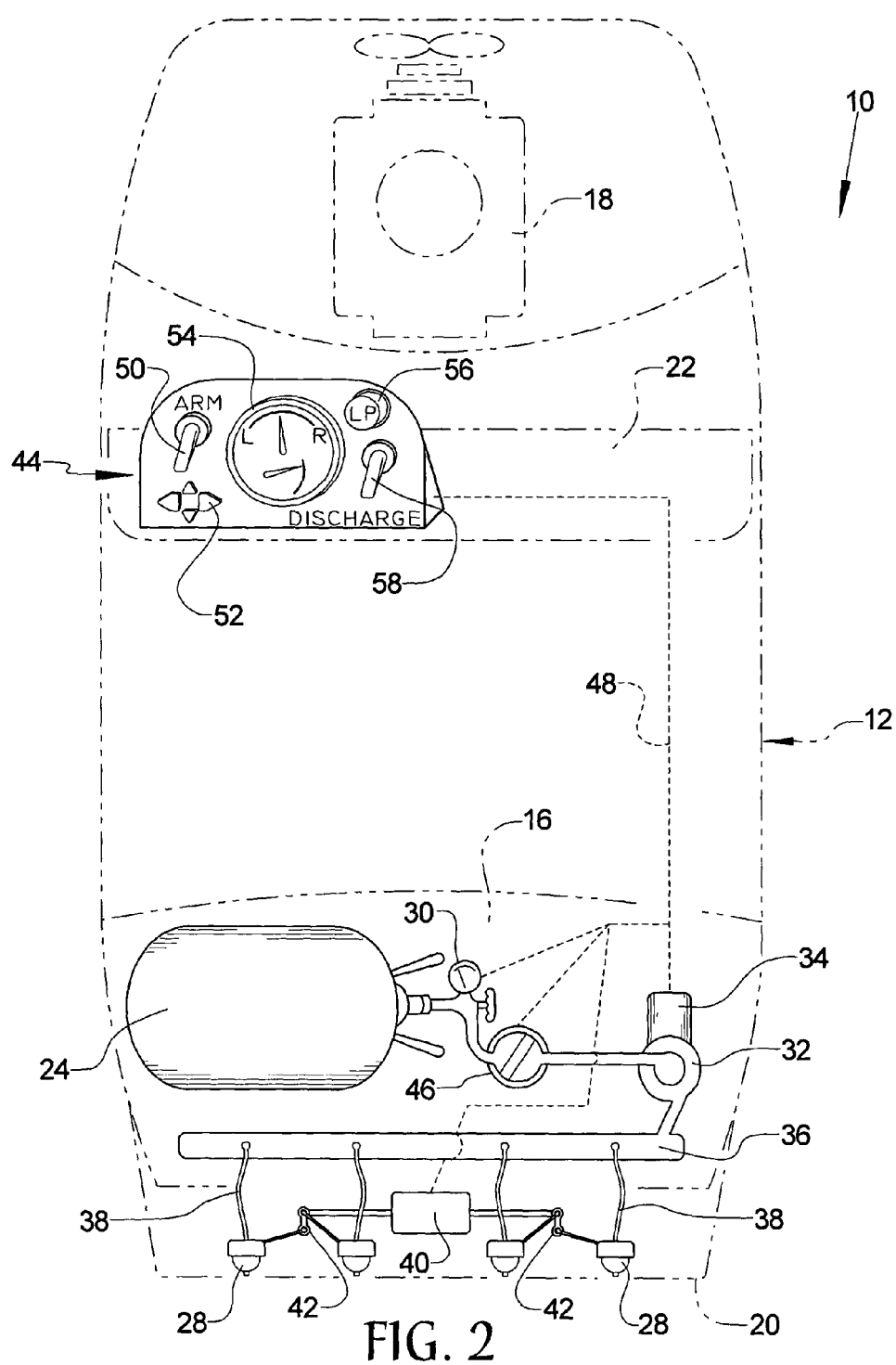
FIG. 2 is a schematic view of the engine disabler spray system.

Referring now to the drawings, it is seen that the engine disabler spray system of the present invention, generally denoted by reference numeral 10, is comprised of a first vehicle 12, such as a police or other emergency vehicle that is typically involved in subduing a fleeing second vehicle 14. The first vehicle 12 is a typical vehicle and has, among other components, a trunk 16 that is rearward of the compartment that holds the engine 18, a rear bumper 20, and a dashboard 22. A tank 24 is stored within the first vehicle 12 and is located at any desired point such as the trunk 16, which tends to have an abundance of storage area (or in the bed if the first vehicle is a pickup truck). The tank 16 has a fire suppressant agent 26 stored therein. The fire suppressant agent 26 is FE-36 clean agent fire extinguishant, or may be selected from the group consisting of: Halon 1211, Halon 1301, IG-541, HFC-227ea, HFC-2 (FE13), HCFC Blend A, Carbon Dioxide, high expansion foam, protein foam, AFFF, microbial containing foam, Carbon Tetrachloride, dry powder extinguishant, and wet chemical extinguishant, etc. At least one discharge nozzle 28 is fluid flow connected with the tank 24, and is, advantageously, disposed within a rear portion of the first vehicle 12 such as on the rear bumper 20 or on or in the trunk lid of the vehicle 12. As seen in FIG. 1, the tank 24 has an appropriate pressure gauge 30 thereon, while a boost pump 32 is used to pump the fire suppressant agent 26 from the tank 24 to each nozzle 28. An appropriate pump motor 34 may be used to rive the pump 32. If more than one discharge nozzle 28 is used, manifold 36 is used to distribute the fire suppressant agent 26 from the tank 24 to each discharge nozzle 28. The line 38 fluid flow connecting the manifold 36 with each discharge nozzle 28, is advantageously flexible, in order to allow articulation of each discharge nozzle 28 and to help prevent damage to the system 10 in the event that the rear of the first vehicle 12 is bumped as can happen in the ordinary course of driving the vehicle 12. Articulation of each discharge nozzle 28 is controlled by an appropriate servo motor 40 that uses an appropriate linkage, such as the illustrated ball joint linkage 42 for controlling up and down as well as left and right directional control of each discharge nozzle 28. The pump motor 34 and servo motor 40 are electrically connected to the vehicle's electrical system in standard fashion in order to have operational electrical power.

A control panel 44 is provided and is advantageously mounted within the first vehicle, at an appropriate location, such as on the dashboard 22 of the first vehicle, although the control panel 44 may be located at any other point, and may be integral with the computer system (not illustrated) used by a user of the first vehicle 12, on a wireless pad (not illustrated), etc. The control panel 44 is control signal connected with the pump motor 34, the tank pressure gauge 30, the servo motor 40, a control valve 46 for controlling discharge from the tank 24, and any other appropriate element of the system 10, by an electrical line 48, or may be wirelessly control signal connected thereto in any standard fashion. The control panel 44 allows a driver or passenger within the first vehicle 12 to control all aspects of the system 10. Specifically, an arm switch 50 on the control panel 44 allows the system 10 to become armed and ready for use by opening the control valve 46 of the tank 24. A directional control switch 52 allows articulation of the nozzles 28 for controlling the specific direction of fire suppressant agent 26 discharge therefrom. The control switch 52, which may be of any known configuration, such as the illustrated up-down-left-right switch, a joy stick, etc., allows directed spraying from the discharge nozzles 28. A position indicator gauge 54 allows a user to see the current position of the discharge nozzles 28 in order that the discharge nozzles 28 may be trimmed as desired by the control switch 52. A low pressure indicator or light 56 may be included on the control panel 44 for indicating a low pressure situation within the tank 24. A discharge switch 58 is located on the control panel 44 for activating the pump motor 34 for discharging the fire suppressant agent 26 through the discharge nozzles 28. Additional control switches that may be provided include a spray to mist controller to allow a user to discharge the fire suppressant agent 26 in a spray pattern or as a mist, a variable control for the pump 34 to allow control of the force of discharge of the fire suppressant agent 26, etc.

In order to use the engine disabler spray system 10 of the present invention, the tank 24 located within the first vehicle is filled with a fire suppressant agent 26 in the usual way. Once the first vehicle 12 is attempting to stop a fleeing second vehicle 14, such as a stolen vehicle that refuses to stop for law enforcement, the first vehicle 12 positions itself ahead of the fleeing second vehicle 14. The engine disabler spray system 10 is armed by the appropriate switch 50 and the discharge nozzles 28 are articulated into the desired position so that they discharge toward the air intake of the second vehicle 14. Once the first vehicle 12 and its discharge nozzles 28 are appropriately positioned, the discharge switch 58 is activated so that the fire suppressant agent 26 is pumped, by the boost pump 32, out through the discharge nozzles 28. The fire suppressant agent 26 is sucked through the air intake of the second vehicle 14 and is passed into the combustion chamber of the engine of the second vehicle, wherein the fire suppressant agent suffocates the second engine and thereby causes the engine to stop firing and the second vehicle 14 rolls to a stop, wherein law enforcement personal may take appropriate action. The first vehicle 12 positions the attitude of the discharge nozzles 28 so that they optimally discharge the fire suppressant agent 26 at the air intake of the second vehicle's engine, by either positioning of the first vehicle 12, by proper articulation of the discharge nozzles 28, or a combination thereof. While the fire suppressant agent 26 causes the engine of the fleeing second vehicle to suffocate, the fire suppressant agent 26 does not result in long term damage to the engine and also allows the second vehicle 14 to come to a controlled stop.

While the invention has been particularly shown and described with reference to an embodiment thereof, it will be appreciated by those skilled in the art that various changes in form and detail may be made without departing from the spirit and scope of the invention.

I claim:

1. An engine disabler for disabling an engine of a vehicle being pursued comprising:
    a passenger vehicle having a front that is a forward region of the vehicle whenever the vehicle is traveling in a forward or drive manner and a rear and a cargo area in the rear, the vehicle having a at least one body panel;
    a tank disposed within the cargo area having a liquid fire suppressant agent stored therein;
    a discharge nozzle fluid flow connected with the tank and protruding through the at least one body panel located at the rear of the vehicle;
    wherein the fire suppressant agent is pumped from the tank and through the discharge nozzle and directed at an air intake of the engine of the vehicle being pursued, such that when the air intake of the engine sucks the fire suppressant agent, the engine is thereby disabled.

2. The engine disabler as in claim 1 wherein the nozzle is capable of being directionally controlled.

3. The engine disabler as in claim 2 further comprising a directional control switch for directionally controlling the nozzle.

4. The engine disabler as in claim 1 further comprising a servo motor mechanically linked to the nozzle for directionally controlling the nozzle.

5. The engine disabler as in claim 4 further comprising a directional control switch for directionally controlling the nozzle.

6. The engine disabler as in claim 1 wherein the fire suppressant agent is FE-36 clean agent fire extinguishant.

7. The engine disabler as in claim 1 wherein the fire suppressant agent is selected from the group consisting of: Halon 1211, Halon 1301, IG-541, HFC-227ea, HFC-2 (FE13), HCFC Blend A, Carbon Dioxide, high expansion foam, protein foam, AFFF, microbial containing foam, Carbon Tetrachloride, dry powder extinguishant, and wet chemical extinguishant.

8. A disabler for use within a first vehicle having a front that is a forward region of the vehicle whenever the vehicle is traveling in a forward or drive manner and a rear and a cargo area in the rear, the vehicle having a at least one body panel for disabling the engine of a second vehicle, the second vehicle having an air intake air flow connected with the engine, comprising:
    a tank stored within the first vehicle, the tank having a liquid fire suppressant agent stored therein;
    a discharge nozzle fluid flow connected with the tank, the discharge nozzle protruding, through a body panel located at the rear of the first vehicle; and
    wherein the fire suppressant agent is pumped from the tank and through the discharge nozzle and directed at an air intake of the engine of the second vehicle, such that when the air intake of the engine sucks the fire suppressant agent, the engine is thereby disabled.

9. The disabler as in claim 8 wherein the nozzle is capable of being directionally controlled.

10. The disabler as in claim 9 further comprising a directional control switch for directionally controlling the nozzle.

11. The disabler as in claim 10 wherein the directional control switch is mounted on a dashboard of the first vehicle.

12. The disabler as in claim 8 further comprising a servo motor mechanically linked to the nozzle for directionally controlling the nozzle.

13. The disabler as in claim 12 further comprising a directional control switch for directionally controlling the nozzle.

14. The disabler as in claim 13 wherein the directional control switch is mounted on a dashboard of the first vehicle.

15. The disabler as in claim 8 wherein the fire suppressant agent is FE-36 clean agent fire extinguishant.

16. The disabler as in claim 8 wherein the fire suppressant agent is selected from the group consisting of: Halon 1211, Halon 1301, IG-541, HFC-227ea, HFC-2 (FE13), HCFC Blend A, Carbon Dioxide, high expansion foam, protein foam, AFFF, microbial containing foam, Carbon Tetrachloride, dry powder extinguishant, and wet chemical extinguishant.

17. The disabler as in claim 8 wherein the tank is located within a trunk of the first vehicle.

18. The disabler as in claim 8 wherein the nozzle is disposed within a rear bumper of the first vehicle.

* * * * *